(12) United States Patent
Machalica et al.

(10) Patent No.: US 11,281,567 B1
(45) Date of Patent: Mar. 22, 2022

(54) SELECTING AN OPTIMAL SUBSET OF SOFTWARE TESTS FOR EXECUTION

(71) Applicant: Meta Platforms, Inc., Menlo Park, CA (US)

(72) Inventors: Mateusz Szymon Machalica, Seattle, WA (US); Scott Hovestadt, San Francisco, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 68 days.

(21) Appl. No.: 16/890,907

(22) Filed: Jun. 2, 2020

(51) Int. Cl.
  *G06F 11/36* (2006.01)
  *G06N 20/00* (2019.01)
  *G06N 7/00* (2006.01)

(52) U.S. Cl.
  CPC .......... *G06F 11/3676* (2013.01); *G06N 7/00* (2013.01); *G06N 20/00* (2019.01)

(58) Field of Classification Search
  CPC ....... G06F 11/3676; G06N 20/00; G06N 7/00
  USPC .................................. 717/120–167
  See application file for complete search history.

(56) References Cited

U.S. PATENT DOCUMENTS

| | | | | |
|---|---|---|---|---|
| 6,138,252 A | * | 10/2000 | Whitten .............. | G06F 11/321 714/25 |
| 6,742,141 B1 | * | 5/2004 | Miller ................ | G06F 11/0748 706/45 |
| 9,235,412 B1 | * | 1/2016 | Cohen ................. | G06F 11/3684 |
| 10,678,678 B1 | * | 6/2020 | Tsoukalas ........... | G06F 11/3664 |
| 2018/0143896 A1 | * | 5/2018 | Ivancic ............... | G06F 11/3612 |

OTHER PUBLICATIONS

Gorthi, Ravi Prakash, et al. "Specification-based approach to select regression test suite to validate changed software." 2008 15th Asia-Pacific Software Engineering Conference. IEEE, 2008.pp. 153-160 (Year: 2008).*

Pasala, Anjaneyulu, et al. "Selection of regression test suite to validate software applications upon deployment of upgrades." 19th Australian Conference on Software Engineering (aswec 2008). IEEE, 2008.pp. 130-138 (Year: 2008).*

Tallam, Sriraman, and Neelam Gupta. "A concept analysis inspired greedy algorithm for test suite minimization." ACM SIGSOFT Software Engineering Notes 31.1 (2005): pp. 35-42. (Year: 2005).*

(Continued)

*Primary Examiner* — Satish Rampuria
(74) *Attorney, Agent, or Firm* — Van Pelt, Yi & James LLP (57) ABSTRACT

For each software test of a plurality of available software tests, one or more code portions corresponding weight factor(s) of a first version of target codebase covered by the corresponding software test are identified. Information retrieval matching is utilized to calculate a corresponding match score for each software test of the plurality of available software tests based on comparisons of the identified one or more identifiers of one or more changed code portions of a second version of the target codebase with the one or more code portion identifiers and the one or more corresponding weight factors associated in the data structure with the corresponding software test. Based on the calculated match scores, one or more software tests of the plurality of available software tests are selected for execution to test the second version of the target codebase.

20 Claims, 5 Drawing Sheets

(56) References Cited

OTHER PUBLICATIONS

Machalica et al. "Predictive test selection: A more efficient way to ensure reliability of code changes". Facebook Engineering. Nov. 21, 2018.
Machalica etl al. Predictive Test Selection. May 29, 2019.
Manning et al. An Introduction to Information Retrieval. Online edition (c) 2009 Cambridge UP. Draft of Apr. 1, 2009. pp. 1-165 (part 1 of 3).
Manning et al. An Introduction to Information Retrieval. Online edition (c) 2009 Cambridge UP. Draft of Apr. 1, 2009. pp. 166-354 (part 2 of 3).
Manning et al. An Introduction to Information Retrieval. Online edition (c) 2009 Cambridge UP. Draft of Apr. 1, 2009. pp. 355-544 (part 3 of 3).

* cited by examiner

SELECTING AN OPTIMAL SUBSET OF SOFTWARE TESTS FOR EXECUTION

BACKGROUND OF THE INVENTION

Many organizations maintain a repository for code. Code change committed by a developer for incorporation into production should be tested to ensure it does not introduce errors that break the product, application, or service being developed using the code. For example, testing can be performed to validate integration, integrity, and/or functionality. However, when several tens of thousands of changes are being submitted to the code repository every week, exhaustively executing tens of thousands of available tests each time is often impractical.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

If every available software test cannot be executed to test a code change due to resource constraints, a selected optimal subset of the available software tests can be selected for execution. A change-based test selection strategy is to choose tests that are known to cover/execute the modified code. In various embodiments, a software test covers a code portion (e.g., a source code file) of a codebase if the code portion is referenced (e.g., a class included in the file is referenced), called (e.g., a method included in the file is called), entered (e.g., a branch included in the file is entered), or otherwise accessed or executed (e.g., a statement included in the file is executed) during execution of the software test. However, many tests each tend to cover vast portions of the code, despite not necessarily detecting errors/bugs in all of the covered code effectively. In one example scenario, it has been observed that 99% of all tests cover more than 10,000 code files of a codebase (e.g., collection of code that functions together to provide a particular application or service), and one test even covers as many as 90,000 files. It would be a hard argument to defend that this one test effectively prevents bugs in the code of 90,000 files. The intuition is that many code files contain common, lower-level code and are not that relevant from the point of view of desired testing (e.g., end-to-end testing), which often focuses on high-level functionality and interactions.

Unintuitive parallels can be drawn from information retrieval, where one aims to find relevant documents for a particular textual query, based on words (i.e., terms) common to the query and retrieved documents. When searching natural language text, one has to deal with many words that appear everywhere, such as "a," "the," "it," etc. While many documents and queries contain these common terms, they do not impact relevance of a document and a query much, if at all. Terms specific to only a handful of documents, on the other hand, have high impact on the relevance, if present in the query. For example, searching for "distillation saturation" yields many vaguely related results, while adding "azeotrope" to the query adequately narrows down the results. An insight is that the problem of selecting relevant subsets of tests for a particular code change can be applied to the problem of searching a corpus of documents based on textual query. In some embodiments, each file in a codebase is treated effectively as a word; a test thus becomes a document comprised of all files (words) it covers, while a code change (diff) becomes a query containing all files (words) touched in a corresponding commit. A search engine would proceed by calculating relevance scores between each document and the query, and returning a certain number of highest-scoring documents. For example, scores for each test that covers any of the files changed in the diff are calculated and a certain number of such tests with the highest scores is selected. The free parameter, that is the number of highest-scoring tests (documents) selected (retrieved), is the knob one can twist either way to balance the chances of selecting (retrieving) the right test (document) and the cost of exercising (presenting) large numbers of tests (documents). Score calculation may properly discount relevance score contributions based on how specific a particular file changed in a diff in the context of a particular test.

In some embodiments, for each software test of a plurality of available software tests, one or more code portions of a first version of target codebase tested by the corresponding software test are identified. A weight factor is determined for each of the one or more code portions of the first version of the target codebase identified for each software test of the plurality of available software tests. Each software test of the plurality of available software tests is associated with one or more code portion identifiers and corresponding weight factors for the one or more code portions of the first version of target codebase identified for the corresponding software test. For example, in a table/database, an entry for one of the software tests includes filename identifiers (e.g., effectively acting as words) of files accessed/executed by the software test and weight factors for the corresponding filename identifiers. When an indication of a second version of the target codebase is received (e.g., code change submitted for testing), one or more identifiers of one or more code portions of the second version of the target codebase that has changed from the first version of the target codebase are received. Utilizing information retrieval matching, a match score is calculated for each of the plurality of available software tests based on comparisons of the identified identifiers of one or more changed code portions of the second version of the target codebase with the one or more code portion identifiers and corresponding weight factors associated with the corresponding software test of the plurality of available software tests. Based on the calculated match scores, an optimal set of one or more software tests of the plurality of available software tests is selected for execution to test the second version of the target code.

Figure 1:
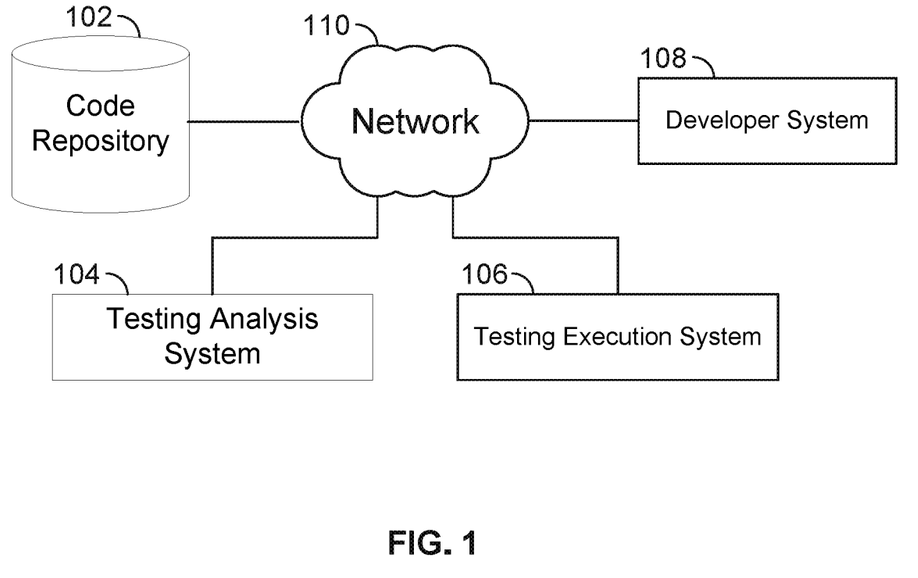
FIG. 1 is a diagram illustrating an embodiment of a software testing environment.

FIG. 1 is a diagram illustrating an embodiment of a software testing environment. Code repository 102 stores a codebase including one or more versions of computer source code for a software product, service, and/or application. A developer using developer system 108 (e.g., computer) is able to store code developed or modified by the developer in code repository 102. In some embodiments, prior to allowing code change(s) to be a part of a version identified as a stable, finalized, released, and/or production ready version, the code change(s) and the codebase version including the code change(s) are to be tested using one or more software tests. There may exist a library of eligible and available software tests that can be executed to test the code item and the version. These available software tests may include functional tests (e.g., one or more tests to test function of the code change(s) in isolation) and/or end-to-end tests (e.g., one or more tests that test the code item in the context of workflow and other related code items, services, systems, and/or execution environments). However, performing a complete test using all of the eligible software tests (e.g., to perform a complete end-to-end test) may be prohibitive for a large number of code changes taking place. Testing analysis system 104 includes one or more servers that perform an analysis of code change(s) and selects the most optimal subset of eligible tests to perform to test the code change(s) (e.g., given available amount of resources). Testing execution system 106 executes and performs these optimal selection of tests selected by testing analysis system 104. In some embodiments, testing analysis system 104 and testing execution system 106 are included in the same set of one or more servers. The components shown in FIG. 1 communicate via network 110. Examples of network 110 include the Internet, Local Area Network (LAN), Wide Area Network (WAN), Storage Area Network (SAN), cellular, and/or any other wired or wireless network. The embodiment shown in FIG. 1 is merely an example and has been simplified to illustrate the embodiment clearly. Any number of elements shown in FIG. 1 may exist in various other embodiments. Other elements not shown in FIG. 1 may exist in various other embodiments.

Figure 2:
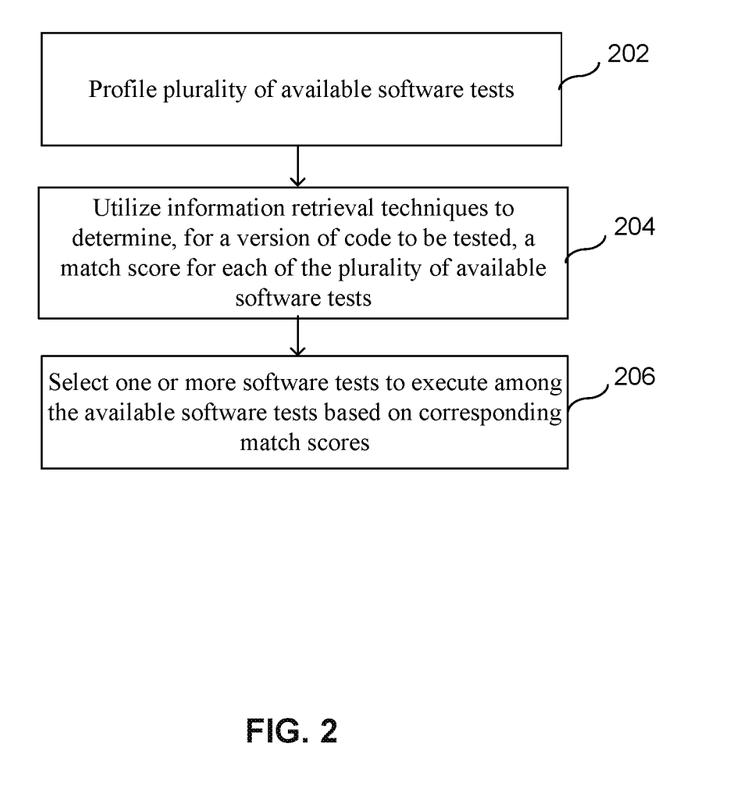
FIG. 2 is a flowchart illustrating an embodiment of a process for selecting an optimal set of software tests for execution.

FIG. 2 is a flowchart illustrating an embodiment of a process for selecting an optimal set of software tests for execution. The process of FIG. 2 may be performed by testing analysis system 104 of FIG. 1.

At 202, available software tests are profiled. Examples of a software test included in the available software tests include applicable executable codes/programs that can be executed to test a target software code/codebase to perform a functional test and/or at least a portion of an end-to-end test. In some embodiments, the available software tests have been selected from a larger library of software tests and have been identified as applicable and eligible for use in testing target software code/codebase. Profiling the software tests includes monitoring and discovering information about each of the available software tests (e.g., determine test code coverage). For example, each of the available software tests is allowed to execute to test a target codebase and information on the software tests is monitored and collected during test execution. One example of the collected information includes identifiers of specific code portions (e.g., code files, methods, classes, statements, edges, branches, conditions, and/or lines, etc.) of the target codebase that a software test executes and/or covers. Other examples of the collected information include runtimes, resource utilization (e.g., storage, memory, and/or processing resource utilization), test flakiness, etc. If the testing coverage of each test can be determined, only the tests that affect the portion of the codebase that has changed in a version to be tested need to be executed.

However, many tests tend to cover vast portions of the codebase, despite not necessarily detecting errors/bugs in all of the covered code effectively. The intuition is that many code files contain common, lower-level code and are not that relevant from the point of view of desired testing (e.g., end-to-end testing), which often focuses on high-level functionality and interactions. If every available software test cannot be executed to test a code change due to resource constraints, a selected optimal subset of the available tests can be selected for execution. A change-based test selection strategy is to choose tests that are known to execute the modified code. To aid in test selection, profiling the available tests includes determining a weight factor (e.g., an importance metric) for each code portion identified as executed/covered by each test. For example, in a table/database, an entry for one of the software tests includes code portion identifiers (e.g., source code filenames) covered (e.g., accessed/executed) by the software test and weight/importance factors corresponding to the code portion identifiers.

At 204, information retrieval matching is utilized to determine, for a version of code to be tested, a match score for each of the plurality of available software tests. The match scores allow the available software tests to be ranked and compared against one another to determine the most optimal set of tests to be performed. For example, when a new version of target code is received for testing (e.g., code changes to a codebase submitted for testing), one or more identifiers of one or more portions of the new version of the target code that has changed from the first version of the target code are determined. In some embodiments, utilizing information retrieval matching, these identifiers are searched among the code portion coverage identifiers corresponding to the various available software tests profiled in 202 to calculate the corresponding match score for each of the plurality of available software tests.

At 206, one or more software tests are selected for execution among the available software tests based on the corresponding match scores. A software test with a higher match score is more likely to be selected than one with a lower match score. For example, a number of the available software tests with the match scores that are larger/better than other not selected software tests is selected for execution. Software tests with match scores that are zero are not selected to be performed/executed.

In some embodiments, a software test with a lower match score is selected over a test with a higher match score to include a diversity of tests within the selected group of software tests for execution. For example, the available software tests have been categorized into different categories (e.g., based on test type, test author/provider, historical performance/result correlation, etc.) and are selected from the different categories in a round robin fashion or other distribution manner based on the match scores of software tests in each category (e.g., when selecting from a category, select software test with the highest match score test in the category). The number of software tests that have been selected may be a predetermined number (e.g., fixed number each time), determined based on a predetermined resource budget (e.g., tests selected until predicted resource required to execute them meets the budget), or determined based on a dynamically determined amount of resource available to perform the tests (e.g., number of selected tests varies based on current amount of available server resources).

Figure 3:
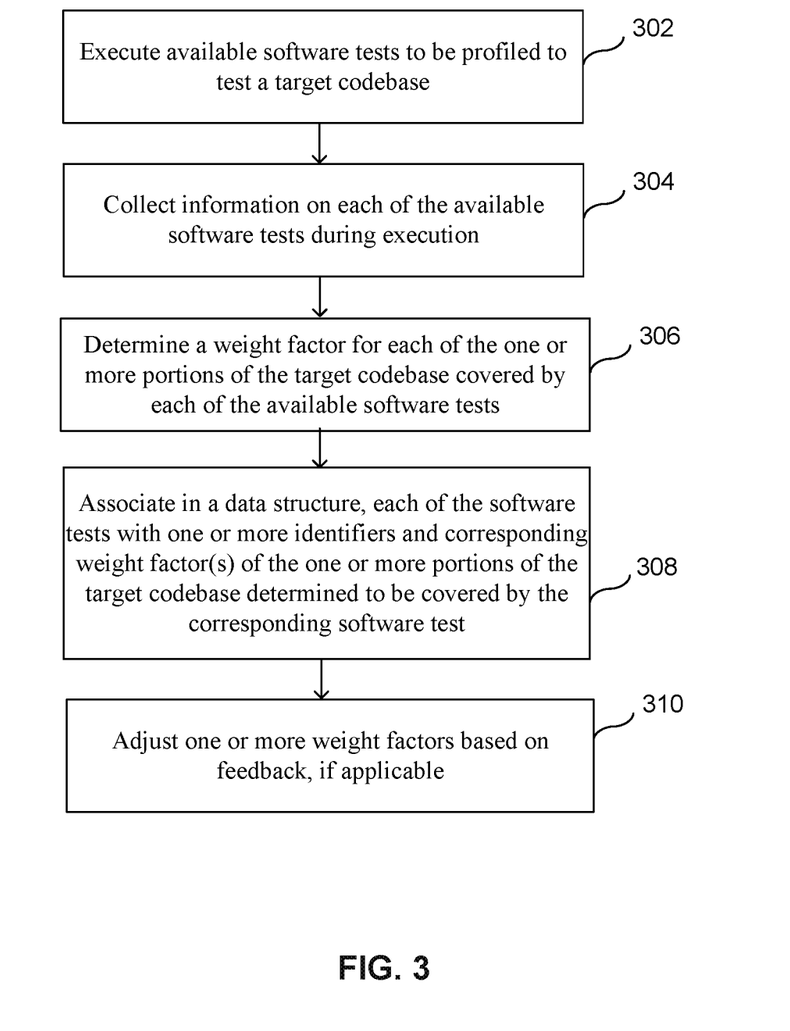
FIG. 3 is a flowchart illustrating an embodiment of a process for profiling available software tests.

FIG. 3 is a flowchart illustrating an embodiment of a process for profiling available software tests. In some embodiments, at least a portion of the process of FIG. 3 is included in 202 of FIG. 2. The process of FIG. 3 may be performed by testing analysis system 104 of FIG. 1. In some embodiments, the process of FIG. 3 allows target codebase to be profiled against a library of available software tests to gather and determine information that can be used to identify the most appropriate subset of the tests to execute to test a change to the target codebase without executing the entire library of available software tests again. The process of FIG. 3 may be performed periodically and/or dynamically for each significant update (e.g., greater than a threshold amount of changes) to the target codebase or new significant version of the codebase (e.g., for each new whole version number, etc.).

At 302, available software tests to be profiled are executed to test a target codebase. Examples of a software test included in the available software tests to be profiled include executable code/program that can be executed to test the target software code/codebase to perform a functional test and/or at least a portion of an end-to-end test. In some embodiments, the software tests to be profiled have been selected from a larger library of software tests and have been identified as applicable and eligible for use in testing the target codebase.

At 304, information is collected on each of the available software tests during execution. In some embodiments, using information reported by the software tests, the target codebase, and/or a third monitoring program, information on each of the available software tests is monitored and discovered to determine test code coverage. One example of the collected information includes identifiers of specific code portions (e.g., files, methods, classes, statements, edges, branches, conditions, and/or lines, etc.) of the target codebase that a software test executes and/or covers. For example, if a specific software test executes code from a specific file of the target codebase, the filename of the specific file is recorded as executed/covered by the specific software test. Other examples of the collected information include runtimes, resource utilization (e.g., storage, memory, and/or processing resource utilization), test flakiness, etc.

At 306, a weight factor is determined for each of one or more portions of the target codebase covered by each of the available software tests. For example, in 304, identifiers of specific code portions (e.g., filenames, function names, class names, etc.) of the target codebase that has been executed by each software test have been recorded to identify which portion(s) of the target codebase have been executed/accessed by each of the software tests. However, execution or access of a code portion by a test may not necessarily mean that the test is actually effectively testing that code portion. In one example scenario, it has been observed that 99% of all tests each cover more than 10,000 code files of a codebase because many code files contain common, lower-level code that is not that relevant for desired testing (e.g., end-to-end testing), which often focuses on high-level functionality and interactions. For each software test, in order to identify the importance of a particular test to a particular code portion of the target codebase, a corresponding weight factor identifying the relative importance of each code portion identified as covered/executed by the software test is determined. In some embodiments, the weight factor at least in part reflects how important a particular code portion is to a particular software test amongst all of the software tests.

In some embodiments, a weight factor of a particular target code portion for a particular software test is proportional to the amount or the number of times the particular target code portion is executed/accessed by the particular software test. For example, if the particular target code portion is executed/accessed a large number of times by the same test, a weight factor corresponding to the particular target code portion is weighted as more important (e.g., higher value) as compared to a weight factor for another target code portion that is executed/accessed a smaller number of times.

In some embodiments, a weight factor of a particular target code portion for a particular software test is determined based on its uniqueness across all of the available software tests. For example, if the same particular target code portion is executed/accessed by a large number of software tests, a weight factor corresponding to the particular target code portion is weighted as less important (e.g., lower value) compared to a weight factor for a different target code portion that is only executed/accessed by a smaller number of software tests. In some embodiments, the weight factor of a particular target code portion for a particular test increases proportionally to the amount or number of times the target code portion is determined to be executed/accessed by the particular test and is reduced by the total number of tests among the software tests being profiled that also execute/access the same particular target code portion.

In some embodiments, a weight factor of a particular target code portion for a particular software test is determined based on its uniqueness within the particular software test. For example, if a particular software test only executes/accesses a single target code portion, its corresponding weight factor is weighted as more important (e.g., higher value) as compared to a particular software test that executes/accesses a large number of target code portions. In some embodiments, the weight factors of all of the target code portions of a particular codebase executed by a particular software test are normalized based on the total number of code portions of the particular codebase executed by the particular test to ensure that software tests that execute a large number of different target code portions a large number of times are not always weighted more important overall as compared to software tests that execute a smaller number of target code portions a smaller number of times. In some embodiments, a weight factor of a particular target code portion for a particular software test is determined based on a probabilistic retrieval model that takes into consideration the number of times a particular target code portion is executed/accessed by the particular software test, the overall total number of any target code portion executions/accesses by the particular software test, the average overall total number of any target code portion executions/accesses by any software test in the software tests to be profiled, and the inverse frequency of the particular target code portion execution/access among the software tests to be profiled (e.g., the total number of tests among the software tests being profiled that also execute/access the same particular target code portion).

At 308, in a data structure, each of the software tests are associated with one or more identifiers and corresponding weight factor(s) of the one or more portions of the target codebase determined to be covered by the corresponding software test. For example, an entry/record in the data structure identifies a particular software test and one or more identifiers of the one or more portions (e.g., filenames) of the target codebase determined to be covered/executed by the corresponding software test (e.g., determined in 304) and one or more corresponding weight factors (e.g., determined in 306) to these one or more identifiers of the one or more portions of the target codebase. In some embodiments, a plurality of different codebases utilize one or more same software tests and the data structure tracks identifiers of covered code portions and corresponding weight factor(s) separately for different codebases or different versions of a codebase. Examples of the data structure include a database, a table, a list, or any other data structure. This data structure is able to be utilized to identify and rank relative rankings of the software tests for a set of one or more changes to the codebase to assist in identifying the most effective tests to execute. Other information about the tests such as runtimes, resource utilization (e.g., storage, memory, and/or processing resource utilization), test flakiness, etc. may also be associated with corresponding software tests and recorded in the data structure.

At 310, one or more weight factors are adjusted based on feedback, if applicable. For example, information about the software tests can be continually tracked as they are executed to test the target codebase and its changes in various different test iterations, and this information is utilized to continually adjust the one or more weight factors. For example, if it is determined that a particular software test is determined to have detected an error on a particular portion of the target codebase many times, it can be concluded that the particular test does effectively test that portion of the codebase and its corresponding weight factor can be increased based at least in part on the number of times the particular software test is determined to have detected an error in the particular portion of the target codebase.

Figure 4:
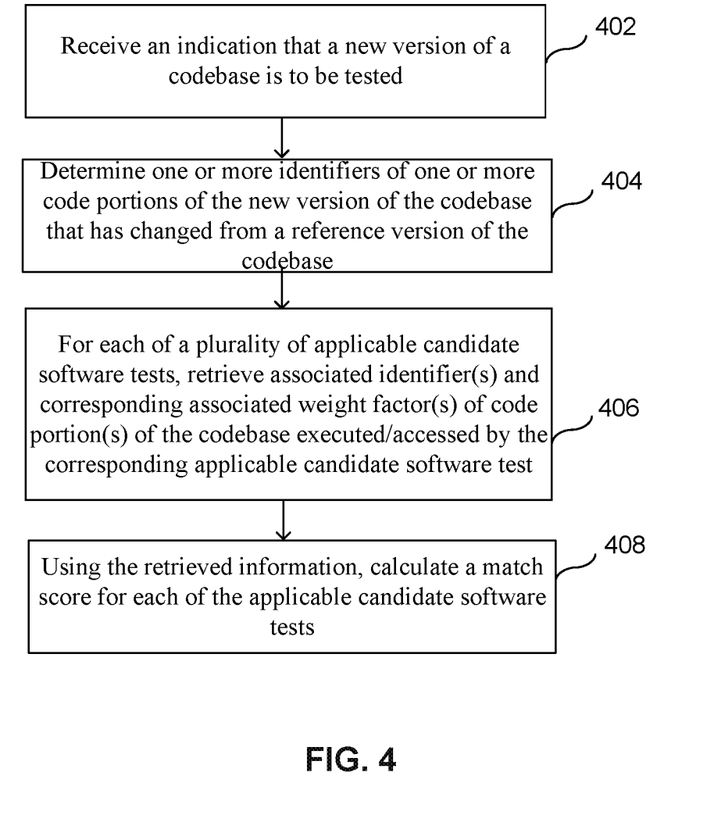
FIG. 4 is a flowchart illustrating an embodiment of a process for calculating match scores for candidate software tests for execution.

FIG. 4 is a flowchart illustrating an embodiment of a process for calculating match scores for candidate software tests for execution. In some embodiments, at least a portion of the process of FIG. 4 is performed in 204 of FIG. 2. The process of FIG. 4 may be performed by testing analysis system 104 of FIG. 1.

At 402, an indication that a new version of a codebase with changes is to be tested is received. For example, a programmer has saved code changes to the codebase (e.g., checked in code changes to code repository 102) and indicated that the modified codebase is ready to be tested. For example, prior to allowing code change(s) to be a part of a version identified as a stable, finalized, released, and/or production ready version, the code change(s) and the codebase (e.g., collection of code that functions together to provide a particular application or service) version including the code change(s) are to be tested using one or more software tests.

At 404, one or more identifiers of one or more code portions of the new version of the codebase that has changed from a reference version of the codebase are determined. In some embodiments, the reference version of the codebase is the latest previous version that has been fully tested using all of the applicable and available software tests (e.g., latest target codebase version utilized in profiling the software tests in 202 of FIG. 2 and/or the process of FIG. 3). In some embodiments, if the reference version of the codebase does not exist because software tests have not been executed and profiled against it, the process ends and the process of FIG. 3 is invoked to fully test the codebase using all of the available and applicable software tests. In some embodiments, the changes in the new version are identified by comparing contents and/or file metadata of the new version against the reference version. In some embodiments, the one or more identifiers of one or more code portions of the new version of the codebase that has changed are one or more filenames of source code files of the codebase that has changed since the reference version (e.g., identified based on file modification metadata dates). Other examples of the identifiers include identifiers of methods, classes, statements, edges, branches, conditions, code lines, etc. In some embodiments, if it is determined that the amount of changes from the reference version to the new version (e.g., percentage of portions of the codebase that have changed) is greater than a threshold amount, the process ends and the process of FIG. 3 is invoked to fully test the codebase using all of the available and applicable software tests. For example, it is determined to not perform further analysis because it would be more effective to execute all of the applicable and available software tests for large wholescale changes to the codebase.

At 406, for each of a plurality of applicable candidate software tests (e.g., available software tests), associated identifier(s) and corresponding associated weight factor(s) of code portion(s) of the codebase executed/accessed by the corresponding applicable candidate software test are retrieved. For example, among a library of software tests, all available software tests that are candidates for execution are identified. For example, for a desired type of test (e.g., end-to-end test), all of the different software tests that are available for execution on the codebase are identified. A data structure stores profiled information about these tests (e.g., stored in 308 of FIG. 3), and entries in this data structure that correspond to these applicable candidate software tests for the reference version of the codebase are retrieved. Each of these entries may identify for a particular software test, one or more covered code portion identifiers and corresponding weight factor(s) of one or more portions of the target codebase covered (e.g., executed/accessed) by the particular software test as well as optionally other associated information (e.g., test execution time, execution resource utilization, etc.).

At 408, using the retrieved information, a match score is calculated for each of the applicable candidate software tests. Using an information retrieval process, for each of the applicable candidate software tests, the associated covered code portion identifier(s) are compared with the one or more identifiers of the one or more changed code portions of the new version of the codebase. This may involve iterating through each of the applicable candidate software tests to identify which of its associated covered code portion identifiers matches any of the identifiers of changed code portions of the new version of the codebase. For example, the one or more identifiers of the one or more changed code portions of the new version of the codebase effectively serve search query terms against the associated covered code portion identifier(s) of the applicable candidate software tests. After the matching covered code portion identifier(s) are identified, the match score for the corresponding software tests is determined based on the retrieved weight factor(s) corresponding to the matching covered code portion identifier(s). For example, for the covered code portion identifier(s) of a particular software test that match the changed code portions, the corresponding weight factor(s) are summed together to at least in part determine the match score for the particular software test.

Figure 5:
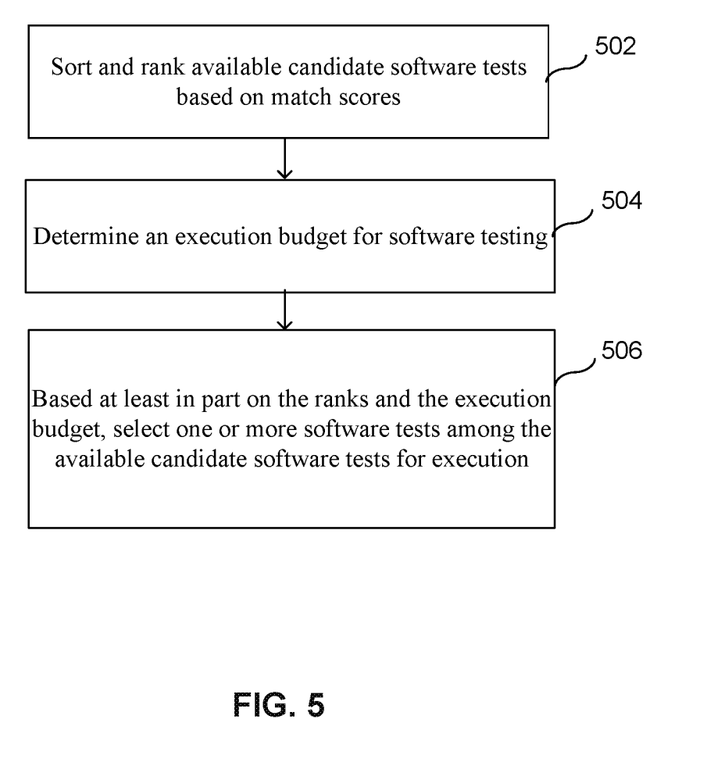
FIG. 5 is a flowchart illustrating an embodiment of a process for selecting software tests for execution based on match scores.

FIG. 5 is a flowchart illustrating an embodiment of a process for selecting software tests for execution based on match scores. In some embodiments, at least a portion of the process of FIG. 5 is performed in 206 of FIG. 2. The process of FIG. 5 may be performed by testing analysis system 104 of FIG. 1.

At 502, available candidate software tests are sorted and ranked based on corresponding match scores. Examples of the corresponding match score for each of the available software tests are the match scores calculated in 408 of the process of FIG. 4. In some embodiments, sorting and ranking the available software test candidates includes determining a decreasing ordering of the available software test candidates from the one with the largest corresponding match score to the one with the smallest corresponding match score. In some embodiments, sorting and ranking the available software test candidates includes categorizing the available software test candidates into different categories and determining an ordering of the test candidates within the category group. Examples of the different categories of the software tests include different categories based on test type, test author/provider, historical performance/result correlation (e.g., results of tests within the same category are correlated with one another and tend to be similar/same), etc. An example of determining the ordering of the software tests within a category group includes determining a decreasing order of the software tests within a same category group from largest corresponding match score to the smallest corresponding match score.

At 504, an execution budget for software testing is determined. The execution budget may be a count number of software tests allowed and/or an amount of resources allowed. For example, a resource budget for software testing and/or a maximum count number of software tests allowed is determined. In some embodiments, the execution budget is fixed and a constant count number of tests and/or a computing resource budget (e.g., execution time) allowed for test execution is fixed. In some embodiments, the execution budget is based on a time of day and/or day of the week, and a count number of tests and/or a computing resource budget (e.g., execution time) allowed for test execution is dynamically variable based on the time of day and/or day of the week. For example, by allowing the execution budget based on a time of day and/or day of the week, historically known workload on servers can be taken into consideration when determining the execution budget. In some embodiments, the execution budget is based on a dynamically determined current availability of testing execution resources. For example, one or more current workload or system utilization metric(s) are determined of one or more computers/servers (e.g., System 106 of FIG. 1) to be utilized for testing, and based on these metric(s), a count number of software tests allowed and/or an amount of processing, storage, and/or network resources that can be utilized for software testing are determined.

At 506, based at least in part on the ranks and the execution budget, one or more software tests among the available candidate software tests are selected for execution. For example, the software test(s) to be executed to test a new version of the codebase indicated in 402 of FIG. 4 are selected. In some embodiments, tests are selected one by one from the available software tests in the order of the determined ranking (e.g., highest to lowest match score) until the execution budget (e.g., number of tests budget or execution time budget) is met (or all available software tests with non-zero match scores have been selected). For example, selected tests can be counted to determine the total number of tests selected or execution time of each selected test obtained from the data structure of 308 of FIG. 3 can be summed together to determine the total execution time for comparison with the execution budget. In some embodiments, in order to include a diversity of tests from different test categories, software tests are selected from the different categories in a round robin fashion or other distribution scheme amongst the categories in the ranking order within a category until the execution budget is met (or all available software tests with non-zero match scores have been selected). The selected software tests are then executed to test the target code/codebase.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
identifying for each software test of a plurality of available software tests, one or more code portions of a first version of target codebase covered by the corresponding software test;
determining for each software test of the plurality of available software tests, a corresponding weight factor for each of the one or more code portions of the first version of the target codebase;
in a data structure, associating with each software test of the plurality of available software tests, one or more code portion identifiers and the one or more corresponding weight factors for the one or more code portions of the first version of the target codebase covered by the corresponding software test;
identifying one or more identifiers of one or more code portions of a second version of the target codebase that has changed from the first version of the target codebase;
utilizing information retrieval matching to determine a corresponding match score for each
software test of the plurality of available software tests based on comparisons of the identified one or more identifiers of one or more changed code portions of the second version of the target codebase with the one or more code portion identifiers and the one or more corresponding weight factors associated in the data structure with the corresponding software test; and based on the determined match scores, selecting one or more software tests of the plurality of available software tests for execution to test the second version of the target codebase.

2. The method of claim 1, wherein the plurality of available software tests has been identified by a group of applicable software tests desired to be executed to test the target codebase.

3. The method of claim 1, wherein the plurality of available software tests perform at least a portion of an end-to-end test of a software product or service provided using the target codebase.

4. The method of claim 1, wherein the one or more code portions of the first version of the target codebase have been identified to be covered by the corresponding software test in response to a determination that the target codebase executed or accessed the identified one or more code portions.

5. The method of claim 1, wherein at least one of the weight factors is proportional to an amount or number of times the corresponding code portion is executed or accessed by the corresponding software test.

6. The method of claim 1, wherein a particular weight factor of weight factors for a particular code portion for a particular software test has been determined based at least in part on uniqueness of the particular code portion across the code portions covered by all of the plurality of available software tests.

7. The method of claim 1, wherein a particular weight factor of weight factors for a particular code portion for a particular software test has been determined based at least in part on uniqueness of the particular code portion within all of the code portions covered by the same particular software test.

8. The method of claim 1, wherein weight factors for code portions covered by a particular software test have been normalized based on a total number of code portions of the codebase executed by the particular software test.

9. The method of claim 1, wherein a particular weight factor of weight factors for a particular target code portion for a particular software test is determined based on a probabilistic retrieval model that takes into consideration a number of times a particular code portion is executed by the particular software test, an overall total number of any code portion executions by the particular software test, an average of an overall total number of any target code portion executions by any software test in the available software tests, and/or an inverse frequency of the particular code portion execution among the available software tests.

10. The method of claim 1, wherein the one or more code portions of the first version of the target codebase are one of the following: one or more files, one or more functions, or one or methods.

11. The method of claim 1, wherein the one or more code portion identifiers for the one or more code portions of the first version of the target codebase covered by the corresponding software test are one or more filenames of the target codebase.

12. The method of claim 1, wherein the data structure includes information on execution times or resource utilization data about the available software tests.

13. The method of claim 1, wherein one or more of the weight factors are adjusted based on feedback from executions of one or more of the available software tests.

14. The method of claim 1, wherein utilizing information retrieval matching to determine the corresponding match scores includes searching through the data structure to identify one or more software tests among the available software tests that match at least a portion of the one or more identifiers of the one or more changed code portions of the second version of the target codebase.

15. The method of claim 1, wherein selecting one or more software tests of the plurality of available software tests for execution includes ranking the plurality of available software tests based on the corresponding match scores.

16. The method of claim 1, wherein selecting one or more software tests of the plurality of available software tests for execution includes sorting the plurality of available software tests into different categories and ranking within each of the categories based on the corresponding match scores.

17. The method of claim 1, wherein selecting one or more software tests of the plurality of available software tests for execution includes selecting a portion of the plurality of available software tests based on an execution budget.

18. The method of claim 17, wherein the execution budget is determined dynamically based on a time of day or a current system utilization metric.

19. A system, comprising:
one or more processors configured to:
identify for each software test of a plurality of available software tests, one or more code portions of a first version of target codebase covered by the corresponding software test;
determine for each software test of the plurality of available software tests, a corresponding weight factor for each of the one or more code portions of the first version of the target codebase;
in a data structure, associate with each software test of the plurality of available software tests, one or more code portion identifiers and the one or more corresponding weight factors for the one or more code portions of the first version of the target codebase covered by the corresponding software test;
identify one or more identifiers of one or more code portions of a second version of the target codebase that has changed from the first version of the target codebase;
utilize information retrieval matching to determine a corresponding match score for each software test of the plurality of available software tests based on comparisons of the identified one or more identifiers of one or more changed code portions of the second version of the target codebase with the one or more code portion identifiers and the one or more corresponding weight factors associated in the data structure with the corresponding software test; and
based on the determined match scores, select one or more software tests of the plurality of available software tests for execution to test the second version of the target codebase; and
a memory coupled with the one or more processors, wherein the memory is configured to provide the one or more processors with instructions.

20. A computer program product, the computer program product being embodied in a non-transitory computer readable storage medium and comprising computer instructions for:
identifying for each software test of a plurality of available software tests, one or more code portions of a first version of target codebase covered by the corresponding software test;
determining for each software test of the plurality of available software tests, a corresponding weight factor for each of the one or more code portions of the first version of the target codebase;

in a data structure, associating with each software test of the plurality of available software tests, one or more code portion identifiers and the one or more corresponding weight factors for the one or more code portions of the first version of the target codebase covered by the corresponding software test;

identifying one or more identifiers of one or more code portions of a second version of the target codebase that has changed from the first version of the target codebase;

utilizing information retrieval matching to determine a corresponding match score for each software test of the plurality of available software tests based on comparisons of the identified one or more identifiers of one or more changed code portions of the second version of the target codebase with the one or more code portion identifiers and the one or more corresponding weight factors associated in the data structure with the corresponding software test; and based on the determined match scores, selecting one or more software tests of the plurality of available software tests for execution to test the second version of the target codebase.

* * * * *